March 12, 1968   H. D. CROTTS   3,372,764

HYDRAULIC LOAD SCALE

Filed Dec. 16, 1966

3,372,764
HYDRAULIC LOAD SCALE
Howard D. Crotts, Cuyahoga Falls, Ohio, assignor to The Firestone Tire & Rubber Company, Akron, Ohio, a corporation of Ohio
Filed Dec. 16, 1966, Ser. No. 602,229
6 Claims. (Cl. 177—208)

ABSTRACT OF THE DISCLOSURE

A portable hydraulic load scale for placement directly on irregular ground surfaces, and adapted to indicate the weight of very heavy loads placed upon its top-plate. The scale has a flexible non-extensible bladder filled with a liquid, a top-plate, and a pressure gauge.

Background of the invention

This invention relates to weighing devices, and particularly to compact scales designed for measuring relatively large weights. More specifically, it relates to portable hydraulic scales designed to give an accurate weight of one wheel of a vehicle even on irregular surfaces.

In the operation of large, heavy vehicles with pneumatic tires, it is often very important for the operator of the vehicle to know how much weight is supported by an individual wheel and tire, so as to determine the optimum inflation air pressure for best service. Either an underinflated or an overinflated tire can cause inefficient operation of the vehicle, excessive tire wear, and even danger of a tire failure or blow-out. When varying load conditions are encountered, the operator might have a need to know what loads are imposed on the tires of the vehicle when conventional fixed scales are not available. Furthermore, the vehicle may be operating on unimproved roads, even off-the-road, where a level, smooth area is not available for using conventional portable scales.

The loading of individual wheels of large trucks is often of great interest, both to police enforcing load regulations, and to truckers who wish to avoid overloading. The use of a light-weight portable scale could facilitate the setting up of weigh-stations on very little notice, to catch violators of loading regulations. Also, a driver who carried such a portable scale could avoid overloading resulting from load shifts or pick-ups en-route.

United States Patent 1,507,242, issued to J. B. Meriam, discloses a portable hydraulic scale which consists of a rigid metal base enclosing a reservoir of liquid, connected through a tube to a gauge. The top of the scale, which supports the weight to be measured, is a flexible plate acting as a resilient diaphragm.

The instant invention differs from that disclosed by Meriam in several important respects. First, the load-bearing hydraulic chamber is a flexible bladder, instead of a rigid metal construction. Flexibility allows the instant invention to be used on uneven surfaces, where such a scale could be most useful. Meriam's rigid base plate would either bend or break if used on uneven surfaces.

Secondly, the use of laminated rubber and fabric in the hydraulic chamber allows a construction which is truly portable. Meriam's scale, in a size large enough to accomplish its purpose, would be considerably heavier.

Summary of the invention

Accordingly, it is an object of this invention to provide a truly portable scale for use in weighing large loads accurately It is another object of this invention to provide a portable scale which may be used on irregular terrain, so as to be useful to an operator of heavy equipment on the job. It is a further object of this invention to provide a simple, uncomplicated weighing device which will give instantaneous measurements of large loads as they are distributed among the wheels of a vehicle. It is a still further object of this invention to provide a light weight hydraulic scale which may be used in the field by operators of heavy equipment so that pressures may be regulated properly on large expensive tires.

The above objects, and other objects which will become apparent from the drawings and descriptions included herein are accomplished as will be shown.

The novel portable scale comprises the following elements: a flat, substantially inextensible, flexible bladder or envelope filled with an incompressible liquid; a gauge or scale to indicate the pressure generated by the load on the bladder; and a rigid top-plate which is placed on top of the bladder.

The bladder may be composed of any material or combination of materials which will produce a fluid-impervious wall which is capable of withstanding high interior pressures without stretching, tough enough to resist cutting or tearing when placed on a rough surface, and yet flexible so as to deflect under load to provide an accurate hydraulic chamber for measurement of the load placed upon it. The preferred embodiment of the bladder of the invention is a laminated structure of rubber and a reinforcing cord fabric, combined and vulcanized into a unit which performs the required functions outlined.

The fluid employed may be any substantially incompressible material which will flow freely. For example, water, oil, ethylene glycol, or kerosene might be used. The preferred material is a standard hydraulic fluid, such as is usually employed in hydraulic jacks, lifts or presses, and is commercially available. In emergency conditions however, any of the fluids mentioned may be used to advantage.

The pressure-indicating device may be one of many such gauges on the market. The gauge may read directly in pounds or tons of load, or be separately calibrated with a conversion chart. A maximum indicating pointer may be employed so that the weight is recorded as the wheel rolls over the scale. In order to protect the gauge from possible damage by the vehicle it is preferred that the gauge and bladder be connected by a section of high pressure hose of suitable length. This precaution is not, however, essential to the operation of the scale.

The plate which is placed on top of the bladder may be of any material or construction which provides a rigid, non-yielding support to the vehicle wheel, and distributes the weight relatively evenly across the bladder. A metal plate of sufficient thickness is the preferred construction, since such a plate is inexpensively and readily available. The size of the plate should correspond roughly to the size of the bladder, although it need not be exactly the same.

In operation, the scale assembly is placed in a convenient location, and the vehicle is moved so that the wheel and tire in question are roughly centered on the top-plate. Because of the low overall height of the bladder and plate, no ramp arrangement should be necessary. The gauge reading may be made instantaneously, and the vehicle moved away.

When the scale is not needed, or when it is being moved to a new location, it may be disassembled, and the hydraulic fluid poured into a more convenient container for storage or moving. The hose fittings on the bladder and gauge may quickly be uncoupled with a small hand wrench. As a result, the scale is a truly portable one.

Applications of this invention are not limited to use as a portable weigh-scale for vehicles. The device may be used on stationary emplacements to measure varying loads or pressures impressed upon the emplacement.

Brief description of the drawings

The drawings illustrate one embodiment of the invention, as follows.

Description of the preferred embodiment

Figure 1:
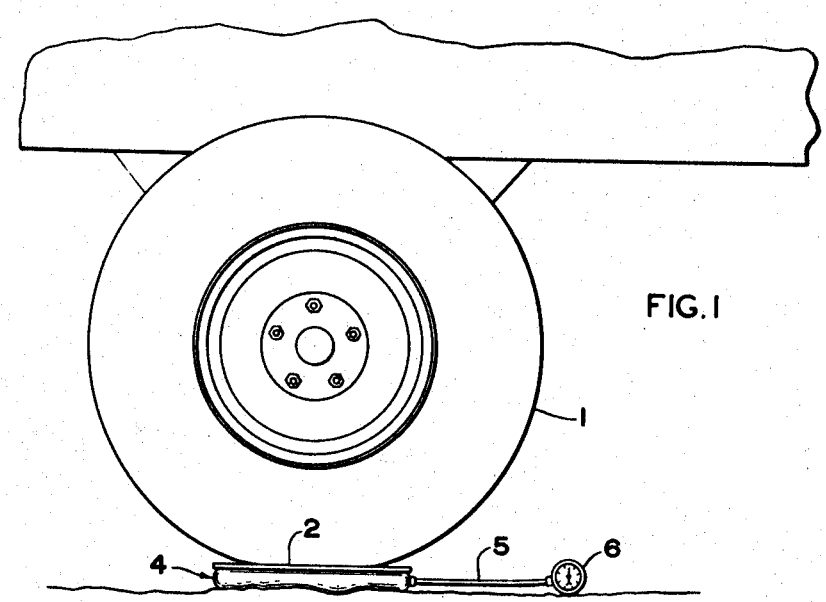
FIGURE 1 is a sideview showing the scale in position beneath a wheel.

Referring to the drawings, FIGURE 1 shows the scale generally, with a vehicle tire 1 substantially centered on top of the plate 2, which in turn is centered on the bladder 4. The bladder 4 is connected to a pressure gauge 6 through tubing 5. The bladder 4 is resting on an irregular ground surface.

Figure 2:
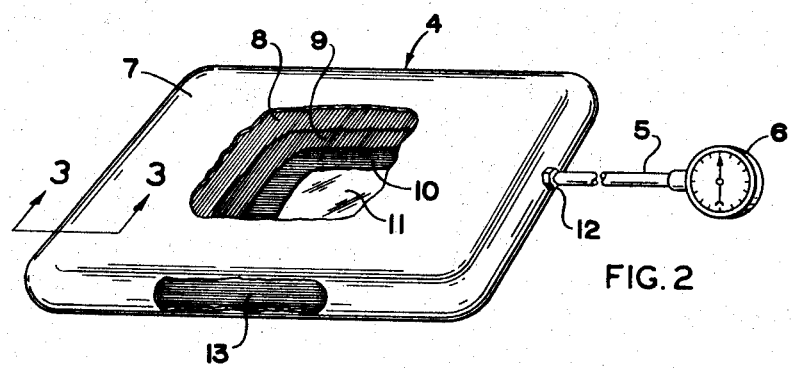
FIGURE 2 is a perspective view of the bladder, with a section broken away to show the cord arrangement.

FIGURE 2 shows details of the construction of the bladder, indicated generally at 4. The outer surface 7 of the bladder is rubber, with fabric plies indicated respectively at 8, 9 and 10, beneath the surface. The bladder is filled with hydraulic fluid 11. A brass fitting 12 is molded into the bladder sidewall for attachment of the hose 5. A cut-away view of the side wall of the bladder shows cords 13 running around the sidewall, parallel to the top and bottom surfaces of the bladder.

Figure 3:
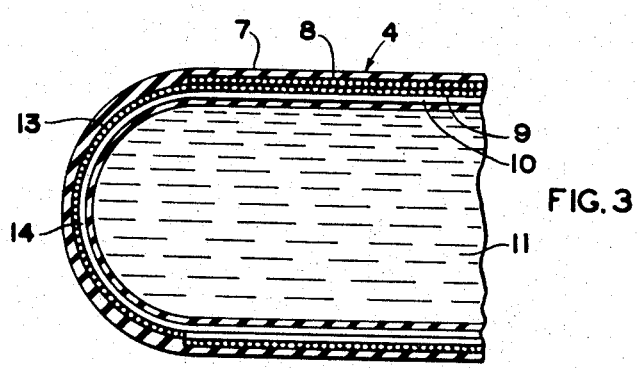
FIGURE 3 is a fragmentary horizontal sectional view of the bladder, taken along line 3—3 in FIGURE 2.

FIGURE 3 shows a cross-section of the bladder wall in still further detail. The cord layer 13 is shown underneath the outer rubber layer 7, with its cords paralleling the top and bottom planes of the bladder. Another cord layer 14 beneath the first layer has its cord direction at right angles to that of 13, so that the two layers combine to provide dimensional stability in two directions. The edge contour shown in FIGURE 3 is that of a semicircle, with its diameter equal to the height of the bladder. This configuration prevents a change in sidewall shape on application of a load, since fluid pressure, acting in all directions tends to push the sidewall into semi-circular cross-sectional shape. Since the bladder is otherwise inextensible, it maintains its shape under load and thus retains the same effective surface area upon which the load is impressed.

To devices similar to that pictured in the drawings and described above were tested and compared with a fixed platform scale. Each bladder was approximately 15 inches square, with a height of approximately 1½ inches, and was filled with water. A Crosby pressure gauge having a capacity of 400 pounds per square inch was connected to each bladder through a short length of high-pressure hose. The bladders were positioned on the platform of a permanently located Fairbanks-Morse scale. A heavy steel plate, 20" by 20" was placed on top of each bladder, and the Fairbanks-Morse scale was adjusted to zero. Calibrations of the bladders established that for scale #1 a gauge deflection of 1 represented a load of 187.5 pounds; for scale #2 a gauge deflection of 1 represented a load of 184.05 pounds. Since the steel plates used had a total weight of 198 pounds, it was necessary to subtract this weight to arrive at the figures for "corrected total calculated loads."

A loaded road-grader was then driven onto the scale so that first its front wheels and then its rear wheels could be weighed by both the portable scales and the platform scale simultaneously. Four separate weighings were made on the front wheels, and four weighings on the rear wheels, the grader being driven off the scales and back on between weighings. An average of the four weighings was computed. Results are summarized in the following table:

| FRONT AXLE | 1 | 2 | 3 | 4 | Average |
|---|---|---|---|---|---|
| #1 Scale-gauge reading | 156 | 154 | 158 | 147 | 153.75 |
| —Calculated load, lb | 29,250 | 28,875 | 29,625 | 27,562 | 28,828 |
| #2 Scale-gauge reading | 149 | 150 | 146 | 153 | 149.50 |
| —Calculated load, lb | 27,423 | 27,607 | 26,871 | 28,160 | 27,515 |
| Corrected Total calculated load, lb | 56,475 | 56,284 | 56,298 | 55,524 | 56,145 |
| Fairbanks-Morse reading, lb | 56,240 | 56,260 | 56,260 | 56,260 | 56,255 |
| Variance, lb | +235 | +24 | +38 | −736 | −110 |
| Percent Variance | +0.42 | +0.04 | +0.07 | −1.31 | −0.20 |

| REAR AXLE | 1 | 2 | 3 | 4 | Average |
|---|---|---|---|---|---|
| #1 Scale-gauge reading | 156 | 156 | 156 | 156 | 156 |
| —Calculated load, lb | 29,250 | 29,250 | 29,250 | 29,250 | 29,250 |
| #2 Scale-gauge reading | 130 | 132 | 131 | 133 | 131.5 |
| —Calculated load, lb | 23,926 | 24,295 | 24,110 | 24,478 | 24,202 |
| Corrected Total calculated load, lb | 52,978 | 53,347 | 53,162 | 53,530 | 53,254 |
| Fairbanks-Morse reading, lb | 52,720 | 53,040 | 52,720 | 53,060 | 52,885 |
| Variance, lb | +258 | +307 | +442 | +470 | +369 |
| Percent Variance | +0.49 | +0.58 | +0.84 | +0.89 | +0.70 |

| TOTAL VEHICLE | 1 | 2 | 3 | 4 | Average |
|---|---|---|---|---|---|
| Grand Total calculated load, lb | 109,453 | 109,631 | 109,460 | 109,054 | 109,399 |
| Total Fairbanks-Morse reading, lb | 108,960 | 109,300 | 108,980 | 109,320 | 109,140 |
| Variance, lb | +493 | +331 | +480 | −266 | +259 |
| Percent Variance | +0.45 | +0.30 | +0.44 | −0.24 | +0.24 |

It may be seen that the greatest variance on any individual weighing from the Fairbanks-Morse readings was 1.31%, and that the greatest variance in total weight was only 0.45%. This degree of accuracy is more than adequate for the purposes specified.

I claim:

1. Portable weighing apparatus comprising:
   a flexible ground-contacting non-extensible envelope forming a closed chamber,
   non-compressible fluid filling said chamber,
   means connected to said envelope indicating the fluid pressure within the said chamber, and
   a flat, substantially rigid member on top of said envelope adapted to support a weight.

2. Apparatus as in claim 1, wherein said envelope has an edge contour which is semi-circular, with the diameter of said semi-circular contour equal to the height of said envelope.

3. Apparatus as in claim 1 wherein said envelope comprises cord-reinforced rubbery material.

4. Apparatus as in claim 3 wherein said cord reinforcement is wire cord.

5. Apparatus as in claim 3 wherein said cord reinforcement is glass cord.

6. Apparatus as in claim 3 wherein said cord reinforcement is polyester cord.

References Cited

UNITED STATES PATENTS 1,507,242  9/1924  Meriam _____ 177—208 X
2,269,969  1/1942  Branick _____ 177—208

FOREIGN PATENTS 556,364  2/1957  Italy.
578,341  6/1958  Italy.

RICHARD B. WILKINSON, *Primary Examiner.*

GEORGE H. MILLER, Jr., *Assistant Examiner.*

UNITED STATES PATENT OFFICE
CERTIFICATE OF CORRECTION

Patent No. 3,372,764            March 12, 1968

Howard D. Crotts

It is hereby certified that error appears in the above numbered patent requiring correction and that the said Letters Patent should read as corrected below.

Column 3, line 64, for "To" read -- Two --.

Signed and sealed this 3rd day of June 1969.

(SEAL)
Attest:

Edward M. Fletcher, Jr.
Attesting Officer

Commissioner of Patents